Jan. 13, 1959

R. B. BEARD 2,868,017

TEMPERATURE MEASURING APPARATUS

Filed Aug. 31, 1954

*INVENTOR.*
RICHARD B. BEARD

BY *Arthur H. Swenson*

ATTORNEY.

United States Patent Office 2,868,017
Patented Jan. 13, 1959

2,868,017

TEMPERATURE MEASURING APPARATUS

Richard B. Beard, Philadelphia, Pa., assignor to Minneapolis-Honeywell Regulator Company, Minneapolis, Minn., a corporation of Delaware Application August 31, 1954, Serial No. 453,350

5 Claims. (Cl. 73—368.2)

A general object of the present invention is to provide a new and improved temperature measuring apparatus. A more specific object of the present invention is to provide an improved temperature measuring apparatus which is characterized by its usefulness in measuring relatively high temperatures with a high degree of sensitivity.

It is known in the art that certain preselected gaseous atmospheres have equilibrium constants which vary with temperature changes. The equilibrium of a preselected atmosphere is determined by the particular amounts and combinations of elements which will remain constant at a particular temperature. When the temperature changes, the equilibrium point of the atmosphere will shift so that there will be a new relationship between the amounts and combinations of elements in the atmosphere. By properly containing a preselected atmosphere and observing the state of equilibrium of the atmosphere, it is possible to obtain an accurate temperature measurement. The equilibrium of an atmosphere and thereby its temperature is determined in the present invention by observing the partial pressure of a constituent of the atmosphere where partial pressure changes of the constituent change with the equilibrium shift of the atmosphere.

It is accordingly a more specific object of the present invention to provide an improved temperature measuring apparatus wherein a measure of the equilibrium of a predetermined atmosphere is used to determine the temperature of the atmosphere.

Another more specific object of the present invention is to provide a gaseous impermeable chamber filled with a preselected atmosphere whose equilibrium shifts with changes in temperature and wherein there is included means for measuring the partial pressure of a constituent of the atmosphere to determine the temperature thereof.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Figure 1:
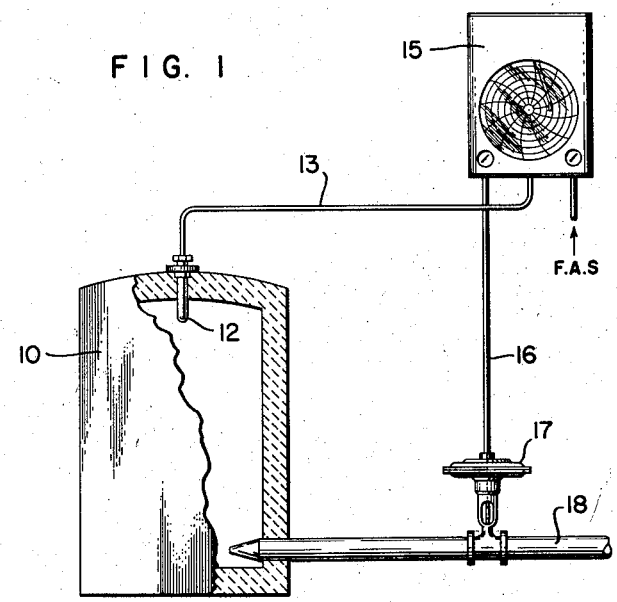
Figure 2:
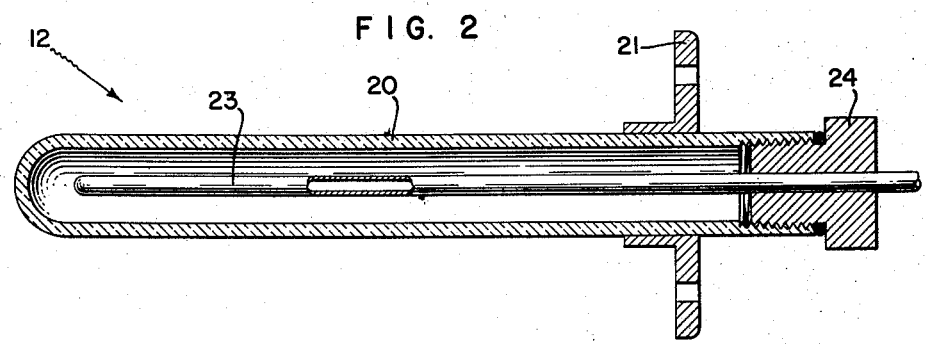

Of the drawings:

Fig. 1 shows a representative form of automatic temperature control apparatus which utilizes the present invention as a component thereof; and Fig. 2 shows a representative cross-sectional detail of the temperature sensing element which forms the basis for the present invention.

Referring first to Fig. 1, the numeral 10 represents a furnace wherein it is desired to measure and maintain a predetermined temperature. It is assumed that the temperature to be maintained within the furnace 10 is a relatively high temperature. Extending through the furnace 10 is a temperature sensing element 12, said element having a capillary tubing 13 leading therefrom to a conventional type of indicating and controlling instrument 15. The instrument 15 may have its indicating dial suitably calibrated in terms of temperature. The instrument 15 is effective to establish on its output conduit 16 a control pressure which is proportional to the temperature within the furnace 10 and this pressure is applied to a control valve 17. The valve 17 is in turn located in fluid flow controlling relationship to a fuel conduit 18, the latter of which supplies fuel to the furnace 10.

The basic functioning of the apparatus of Fig. 1 is that of a conventional temperature controller wherein this sensing element 12 establishes a pressure in the conduit 13 which is indicative of the temperature conditions within the furnace 10. This pressure is effective to actuate the indicating mechanism of the indicator 15 and also the controlling mechanism thereof to establish a proportional output pneumatic pressure in the line 16. This pressure will control the valve 17 to such a position that it will regulate the fuel flowing to the furnace 10 to maintain the temperature in the furnace 10 at a preselected value.

Fig. 2 shows in cross-sectional detail the structure of the temperature sensing element 12. This element comprises an outer gaseous atmosphere seal in the form of a quartz tube 20. This quartz tube is adapted to be extended through the wall of the furnace 10 and mounted thereon by a suitable mounting bracket 21. Tube 20 is hermetically sealed against the entrance of the gas from furnace 10 into tube 20. Projecting into the end of the tube 20 is a further tube 23, the latter of which is formed of a gaseous permeable material, such as palladium. The palladium tube 23 is carried by a suitable supporting means 24 which threadedly engages the end of the quartz tube 20 and forms a seal for the same. If desired, the plug 24 may extend well into the tube 20 to minimize temperature gradient effects. Tube 23 defines a chamber within it.

The inner portion of the quartz tube 20 is filled with a preselected atmosphere. This atmosphere may well be of the so-called "reducing" type of atmosphere which is characterized by its shifting of its equilibrium with changes in temperature. A representative reducing atmosphere is illustrated by the equation as follows:

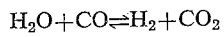

$$H_2O + CO \rightleftharpoons H_2 + CO_2$$

As those skilled in the art understand, the equilibrium of the foregoing reaction will shift to the right or to the left as a function of the temperature of the atmosphere.

It will be noted from the foregoing reaction equation that hydrogen appears in pure form. It will also be apparent that this hydrogen as represented by its partial pressure will appear, at any given temperature, in a quantity which is a direct function of the equilibrium of the reaction. Thus, the equilibrium may be conveniently measured by observing the partial pressure of the hydrogen in the tube 20. Thus, a measure of the temperature to which the atmosphere is subjected may be obtained by measuring the partial pressure of hydrogen in the tube 20. That partial pressure of hydrogen is measured by means including the palladium tube 23. Palladium is one of several elements which exhibits a high degree of permeability to hydrogen and has extremely low permeability to other gases. Thus, the partial pressure of the hydrogen in the chamber within the palladium tube 23 may be utilized as a direct measure of the equilibrium of the atmosphere within the quartz tube 20.

It will be noted that the pressure in the chamber within the palladium tube 23 will vary not only due to the shift in the equilibrium of the atmosphere but will also shift due to the normal expansion of the gases caused by temperature change. Thus, there is a combined additive effect caused by a temperature change, the additive effects being the increased pressure due to the expanding gas and the shift in the equilibrium of the atmosphere causing a change in the partial pressure of the hydrogen.

It will be noted that since the tube 20 is quartz, it is possible to project the sensing element 12 into a very high temperature region without destroying the element even though it is exposed directing to the high temperature medium. The palladium tube is placed within the quartz tube and may take several forms and shapes with the desired form being arranged so that a very small amount of hydrogen must diffuse through the palladium in order to establish an equilibrium between the partial pressure of the hydrogen within the tube 20 and the partial pressure of the hydrogen in the chamber within the tube 23.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described the invention, what is claimed as new and for which it is desired to secure Letters Patent is:

1. Temperature measuring apparatus comprising a hermetic container for disposal in a space where a temperature is to be measured, a mixture of reactant gas constituents in said container and constituting the gaseous atmosphere thereof, the chemical equilibrium of said constituents being dependent upon the temperature thereof, a permeable member defining a chamber in said container, said permeable member passing a constituent of said atmosphere to said chamber to establish a constituent of partial pressure therein in accordance with the temperature to which said atmosphere is subjected, and pressure sensing means connected to said chamber.

2. Apparatus according to claim 1 wherein said gaseous atmosphere includes hydrogen as a constituent thereof, the partial pressure of the hydrogen varying with temperature.

3. Apparatus according to claim 1 wherein the chamber defining member is selectively permeable to hydrogen.

4. Apparatus according to claim 1 wherein said permeable member is composed in major part of palladium.

5. Temperature measuring apparatus, including, a hermetically sealed quartz tube adapted to be extended through the wall of a furnace, a plural-constituent atmosphere in said tube, wherein the concentration equilibrium between or among the various constituents is a function of temperature, one of said constituents being hydrogen, and a sealed palladium tube located within said quartz tube and spaced from portions of said quartz tube to define a chamber between said tubes containing said atmosphere, the hydrogen in said atmosphere diffusing through said palladium tube to establish a partial pressure of hydrogen in the interior of said palladium tube, said palladium tube barring the other constituents from the interior of said palladium tube, so that the partial pressures of said other constituents is not exerted in the interior of said palladium tube, the interior of said palladium tube being adapted to be connected to a pressure-responsive indicating instrument, the shift in the equilibrium of said atmosphere due to a change in the temperature of said atmosphere causing a change in the partial pressure of said hydrogen.

References Cited in the file of this patent

UNITED STATES PATENTS

| | | |
|---|---|---|
| 1,159,893 | Browne | Nov. 9, 1915 |
| 2,072,915 | Willach | June 16, 1932 |
| 2,526,038 | Nelson | Oct. 17, 1950 |
| 2,651,942 | Minter | Sept. 15, 1953 |
| 2,652,497 | Miller | Sept. 15, 1953 |
| 2,739,035 | Regier | Mar. 20, 1956 |